United States Patent
Sterne et al.

(10) Patent No.: US 11,818,015 B2
(45) Date of Patent: Nov. 14, 2023

(54) DEVICE MANAGEMENT

(71) Applicant: NOKIA SOLUTIONS AND NETWORKS OY, Espoo (FI)

(72) Inventors: Jason Thomas Sterne, Ottawa (CA); Richard Kent Foote, Mississauga (CA); Lori-Ann Mcgrath, Stittsville (CA)

(73) Assignee: Nokia Solutions and Networks Oy, Espoo (FI)

( * ) Notice: Subject to any disclaimer, the term of this patent is extended or adjusted under 35 U.S.C. 154(b) by 246 days.

(21) Appl. No.: 17/133,018

(22) Filed: Dec. 23, 2020

(65) Prior Publication Data

US 2022/0197876 A1    Jun. 23, 2022

(51) Int. Cl.
*H04L 41/14*    (2022.01)
*G06F 16/23*    (2019.01)

(52) U.S. Cl.
CPC ........ *H04L 41/145* (2013.01); *G06F 16/2379* (2019.01)

(58) Field of Classification Search
CPC ............... H04L 41/145; H04L 41/0894; H04L 41/0895; H04L 41/0213; H04L 41/0806; H04L 41/40; G06F 16/2379
See application file for complete search history.

(56) References Cited

U.S. PATENT DOCUMENTS 10,326,657 B1    6/2019  Chandrasekhar et al.
10,380,090 B1 *  8/2019  Xiao ..................... G06F 16/282
2014/0279747 A1 * 9/2014 Strassner .............. H04L 41/085
                                                                  706/12
2020/0412614 A1 * 12/2020 A ........................ G06F 16/9024

OTHER PUBLICATIONS

EP Search Report mailed in corresponding EP 21210979.7 dated May 9, 2022, 6 pages.
Cable Television Laboratories, "Data-Over-Cable Service Interface Specifications—Converged Cable Access Platform (CCAP)," CM-SP-CCAP-OSSI-I08-151210, Dec. 10, 2015, 305 pages.

* cited by examiner

*Primary Examiner* — John A Follansbee
*Assistant Examiner* — Fadi Haj Said
(74) *Attorney, Agent, or Firm* — Tong, Rea, Bentley & Kim, LLC

(57) ABSTRACT

Various example embodiments for supporting management of a communication device are presented. Various example embodiments for supporting management of a communication device based on a management model may support management of the communication device based on a management model that includes multiple data models configured to model objects representing elements of the communication device. Various example embodiments for supporting management of a communication device based on a management model may support management of the communication device based on a management model that includes multiple data models configured to support, for a given object representing an element of the communication device, association of sets of instance data generated for the object based on the multiple data models such that the communication device knows to apply the sets of instance data to the underlying operational object instance for the given object representing the element of the communication device.

22 Claims, 7 Drawing Sheets

FIG. 4

AUGMENTATION OF STANDARD DATA MODEL OF OBJECT
400

```
module proprietary-openconfig-policy-policy-definitions-augments {
    namespace "urn:proprietary:os:ns:yang:sr:proprietary-openconfig-
        policy-definitions-augments";

prefix "proprietary-aug";

import openconfig-policy-definitions { prefix "oc-rpol"; } augment /oc-rpol:policy-definitions/oc-rpol:policy-definition/oc-rpol:statements/
        oc-rpol:statement { container external-reference {
            leaf policy-entry-id { type uint32; }
        }
    }
}
```

FIG. 5A

PROPRIETARY OBJECT
INSTANCE DATA
500-P

```
policy-options {
    policy-statement "Ottawa"
        entry 7 {
            // ...
            // a set of proprietary routing policy config here
            // ...
        }
        entry 232 {
            // ...
            // a set of proprietary routing policy config here
            // ...
        }
}
```

FIG. 5B

AUGMENTED STANDARD
OBJECT INSTANCE
DATA
500-S

```
policy-definitions {
    policy-definition "Ottawa"
        statements {
            statement "my-rules" {
                external-reference {
                    policy-entry-id 7
                }
                // ...
                // a set of OpenConfig routing policy config here
                // ...
            }
            statement "other-rules" {
                external-reference {
                    policy-entry-id 232
                }
                // ...
                // a set of OpenConfig routing policy config here
                // ...
            }
        }
}
```

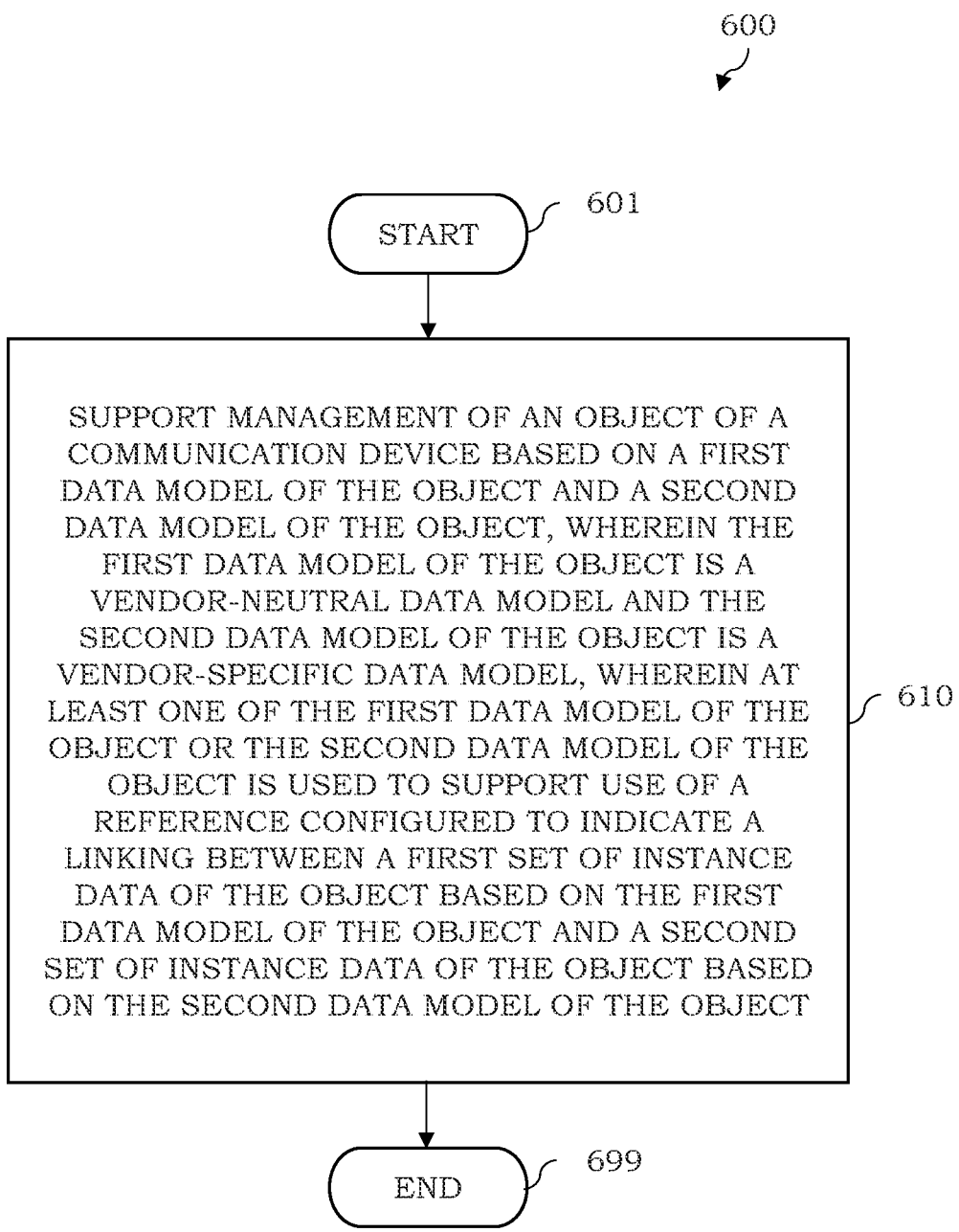

DEVICE MANAGEMENT

TECHNICAL FIELD

Various example embodiments relate generally to communication systems and, more particularly but not exclusively, to management of communication devices in communication systems.

BACKGROUND

In communication systems, various management techniques may be used to manage communication devices of the communication systems.

SUMMARY

In at least some example embodiments, an apparatus includes at least one processor and at least one memory including a set of instructions, wherein the set of instructions is configured to, when executed by the at least one processor, cause the apparatus to support management of an object of a communication device based on a first data model of the object and a second data model of the object, wherein the first data model of the object is a vendor-neutral data model and the second data model of the object is a vendor-specific data model, wherein at least one of the first data model of the object or the second data model of the object is used to support use of a reference configured to indicate a linking between a first set of instance data of the object based on the first data model of the object and a second set of instance data of the object based on the second data model of the object. In at least some example embodiments, the first data model of the object defines a first object identifier in a first format and the second data model of the object defines a second object identifier in a second format different than the first format. In at least some example embodiments, the first format includes a string format and the second format includes a numeric format or the first format includes a numeric format and the second format includes a string format. In at least some example embodiments, the first format includes a list format and the second format includes a hierarchical format or the first format includes a hierarchical format and the second format includes a list format. In at least some example embodiments, the first data model of the object is part of an Internet Engineering Task Force data model or an OpenConfig data model. In at least some example embodiments, the second data model of the object is part of a vendor proprietary data model. In at least some example embodiments, the first data model of the object is based on at least one of a Yet Another Next Generation (YANG) data modeling language, a Unified Modeling Language (UML) data modeling language, or protobuf. In at least some example embodiments, the second data model of the object is based on at least one of a Yet Another Next Generation (YANG) data modeling language, a Unified Modeling Language (UML) data modeling language, or protobuf. In at least some example embodiments, the first data model of the object and the second data model of the object are based on a Yet Another Next Generation (YANG) data modeling language. In at least some example embodiments, the linking between the first set of instance data of the object based on the first data model of the object and the second set of instance data of the object based on the second data model of the object is included within a container of a list element. In at least some example embodiments, the linking between the first set of instance data of the object based on the first data model of the object and the second set of instance data of the object based on the second data model of the object is included within a leaf within the container of the list element. In at least some example embodiments, to support management of the object of the communication device, the set of instructions is configured to, when executed by the at least one processor, cause the apparatus to publish the first data model of the object and the second data model of the object. In at least some example embodiments, to support management of the object of the communication device, the set of instructions is configured to, when executed by the at least one processor, cause the apparatus to store the first data model of the object and the second data model of the object. In at least some example embodiments, to support management of the object of the communication device, the set of instructions is configured to, when executed by the at least one processor, cause the apparatus to store the first set of instance data of the object based on the first data model of the object and the second set of instance data of the object based on the second data model of the object. In at least some example embodiments, to support management of the object of the communication device, the set of instructions is configured to, when executed by the at least one processor, cause the apparatus to execute, at the communication device based on the first data model of the object or the second data model of the object, a management action. In at least some example embodiments, to support management of the object of the communication device, the set of instructions is configured to, when executed by the at least one processor, cause the apparatus to execute, at the communication device based on the linking between the first set of instance data of the object based on the first data model of the object and the second set of instance data of the object based on the second data model of the object, a management action. In at least some example embodiments, to support management of the object of the communication device, the set of instructions is configured to, when executed by the at least one processor, cause the apparatus to send, by a management system toward the communication device based on the linking between the first set of instance data of the object based on the first data model of the object and the second set of instance data of the object based on the second data model of the object, a request for execution of a management action and receive, by the management system from the communication device, an indication of a result of execution of the management action. In at least some example embodiments, to support management of the object of the communication device, the set of instructions is configured to, when executed by the at least one processor, cause the apparatus to receive, by the communication device from a management system, a request for execution of a management action, execute, by the communication device based on the linking between the first set of instance data of the object based on the first data model of the object and the second set of instance data of the object based on the second data model of the object, the management action, and send, by the communication device toward the management system, an indication of a result of execution of the management system. In at least some example embodiments, the object includes at least one of a port, an interface, or an access control list. In at least some example embodiments, the communication device includes a router, a switch, or an endpoint device. In at least some example embodiments, the apparatus includes the communication device or a management system configured to manage the communication device.

In at least some example embodiments, a non-transitory computer-readable medium comprises a set of instructions which, when executed by an apparatus, cause the apparatus to support management of an object of a communication device based on a first data model of the object and a second data model of the object, wherein the first data model of the object is a vendor-neutral data model and the second data model of the object is a vendor-specific data model, wherein at least one of the first data model of the object or the second data model of the object is used to support use of a reference configured to indicate a linking between a first set of instance data of the object based on the first data model of the object and a second set of instance data of the object based on the second data model of the object. In at least some example embodiments, the first data model of the object defines a first object identifier in a first format and the second data model of the object defines a second object identifier in a second format different than the first format. In at least some example embodiments, the first format includes a string format and the second format includes a numeric format or the first format includes a numeric format and the second format includes a string format. In at least some example embodiments, the first format includes a list format and the second format includes a hierarchical format or the first format includes a hierarchical format and the second format includes a list format. In at least some example embodiments, the first data model of the object is part of an Internet Engineering Task Force data model or an OpenConfig data model. In at least some example embodiments, the second data model of the object is part of a vendor proprietary data model. In at least some example embodiments, the first data model of the object is based on at least one of a Yet Another Next Generation (YANG) data modeling language, a Unified Modeling Language (UML) data modeling language, or protobuf. In at least some example embodiments, the second data model of the object is based on at least one of a Yet Another Next Generation (YANG) data modeling language, a Unified Modeling Language (UML) data modeling language, or protobuf. In at least some example embodiments, the first data model of the object and the second data model of the object are based on a Yet Another Next Generation (YANG) data modeling language. In at least some example embodiments, the linking between the first set of instance data of the object based on the first data model of the object and the second set of instance data of the object based on the second data model of the object is included within a container of a list element. In at least some example embodiments, the linking between the first set of instance data of the object based on the first data model of the object and the second set of instance data of the object based on the second data model of the object is included within a leaf within the container of the list element. In at least some example embodiments, to support management of the object of the communication device, the set of instructions is configured to, when executed by the apparatus, cause the apparatus to publish the first data model of the object and the second data model of the object. In at least some example embodiments, to support management of the object of the communication device, the set of instructions is configured to, when executed by the apparatus, cause the apparatus to store the first data model of the object and the second data model of the object. In at least some example embodiments, to support management of the object of the communication device, the set of instructions is configured to, when executed by the apparatus, cause the apparatus to store the first set of instance data of the object based on the first data model of the object and the second set of instance data of the object based on the second data model of the object. In at least some example embodiments, to support management of the object of the communication device, the set of instructions is configured to, when executed by the apparatus, cause the apparatus to execute, at the communication device based on the first data model of the object or the second data model of the object, a management action. In at least some example embodiments, to support management of the object of the communication device, the set of instructions is configured to, when executed by the apparatus, cause the apparatus to execute, at the communication device based on the linking between the first set of instance data of the object based on the first data model of the object and the second set of instance data of the object based on the second data model of the object, a management action. In at least some example embodiments, to support management of the object of the communication device, the set of instructions is configured to, when executed by the apparatus, cause the apparatus to send, by a management system toward the communication device based on the linking between the first set of instance data of the object based on the first data model of the object and the second set of instance data of the object based on the second data model of the object, a request for execution of a management action and receive, by the management system from the communication device, an indication of a result of execution of the management action. In at least some example embodiments, to support management of the object of the communication device, the set of instructions is configured to, when executed by the apparatus, cause the apparatus to receive, by the communication device from a management system, a request for execution of a management action, execute, by the communication device based on the linking between the first set of instance data of the object based on the first data model of the object and the second set of instance data of the object based on the second data model of the object, the management action, and send, by the communication device toward the management system, an indication of a result of execution of the management system. In at least some example embodiments, the object includes at least one of a port, an interface, or an access control list. In at least some example embodiments, the communication device includes a router, a switch, or an endpoint device. In at least some example embodiments, the apparatus includes the communication device or a management system configured to manage the communication device.

In at least some example embodiments, a method includes supporting management of an object of a communication device based on a first data model of the object and a second data model of the object, wherein the first data model of the object is a vendor-neutral data model and the second data model of the object is a vendor-specific data model, wherein at least one of the first data model of the object or the second data model of the object is used to support use of a reference configured to indicate a linking between a first set of instance data of the object based on the first data model of the object and a second set of instance data of the object based on the second data model of the object. In at least some example embodiments, the first data model of the object defines a first object identifier in a first format and the second data model of the object defines a second object identifier in a second format different than the first format. In at least some example embodiments, the first format includes a string format and the second format includes a numeric format or the first format includes a numeric format and the second format includes a string format. In at least some example embodiments, the first format includes a list format and the second format includes a hierarchical format or the first format includes a hierarchical format and the second format includes a list format. In at least some example embodiments, the first data model of the object is part of an Internet Engineering Task Force data model or an OpenConfig data model. In at least some example embodiments, the second data model of the object is part of a vendor proprietary data model. In at least some example embodiments, the first data model of the object is based on at least one of a Yet Another Next Generation (YANG) data modeling language, a Unified Modeling Language (UML) data modeling language, or protobuf. In at least some example embodiments, the second data model of the object is based on at least one of a Yet Another Next Generation (YANG) data modeling language, a Unified Modeling Language (UML) data modeling language, or protobuf. In at least some example embodiments, the first data model of the object and the second data model of the object are based on a Yet Another Next Generation (YANG) data modeling language. In at least some example embodiments, the linking between the first set of instance data of the object based on the first data model of the object and the second set of instance data of the object based on the second data model of the object is included within a container of a list element. In at least some example embodiments, the linking between the first set of instance data of the object based on the first data model of the object and the second set of instance data of the object based on the second data model of the object is included within a leaf within the container of the list element. In at least some example embodiments, supporting management of the object of the communication device includes publishing the first data model of the object and the second data model of the object. In at least some example embodiments, supporting management of the object of the communication device includes storing the first data model of the object and the second data model of the object. In at least some example embodiments, supporting management of the object of the communication device includes storing the first set of instance data of the object based on the first data model of the object and the second set of instance data of the object based on the second data model of the object. In at least some example embodiments, supporting management of the object of the communication device includes executing, at the communication device based on the first data model of the object or the second data model of the object, a management action. In at least some example embodiments, supporting management of the object of the communication device includes executing, at the communication device based on the linking between the first set of instance data of the object based on the first data model of the object and the second set of instance data of the object based on the second data model of the object, a management action. In at least some example embodiments, supporting management of the object of the communication device includes sending, by a management system toward the communication device based on the linking between the first set of instance data of the object based on the first data model of the object and the second set of instance data of the object based on the second data model of the object, a request for execution of a management action and receiving, by the management system from the communication device, an indication of a result of execution of the management action. In at least some example embodiments, supporting management of the object of the communication device includes receiving, by the communication device from a management system, a request for execution of a management action, executing, by the communication device based on the linking between the first set of instance data of the object based on the first data model of the object and the second set of instance data of the object based on the second data model of the object, the management action, and sending, by the communication device toward the management system, an indication of a result of execution of the management system. In at least some example embodiments, the object includes at least one of a port, an interface, or an access control list. In at least some example embodiments, the communication device includes a router, a switch, or an endpoint device. In at least some example embodiments, the method is executed by the communication device or a management system configured to manage the communication device.

In at least some example embodiments, an apparatus includes means for supporting management of an object of a communication device based on a first data model of the object and a second data model of the object, wherein the first data model of the object is a vendor-neutral data model and the second data model of the object is a vendor-specific data model, wherein at least one of the first data model of the object or the second data model of the object is used to support use of a reference configured to indicate a linking between a first set of instance data of the object based on the first data model of the object and a second set of instance data of the object based on the second data model of the object. In at least some example embodiments, the first data model of the object defines a first object identifier in a first format and the second data model of the object defines a second object identifier in a second format different than the first format. In at least some example embodiments, the first format includes a string format and the second format includes a numeric format or the first format includes a numeric format and the second format includes a string format. In at least some example embodiments, the first format includes a list format and the second format includes a hierarchical format or the first format includes a hierarchical format and the second format includes a list format. In at least some example embodiments, the first data model of the object is part of an Internet Engineering Task Force data model or an OpenConfig data model. In at least some example embodiments, the second data model of the object is part of a vendor proprietary data model. In at least some example embodiments, the first data model of the object is based on at least one of a Yet Another Next Generation (YANG) data modeling language, a Unified Modeling Language (UML) data modeling language, or protobuf. In at least some example embodiments, the second data model of the object is based on at least one of a Yet Another Next Generation (YANG) data modeling language, a Unified Modeling Language (UML) data modeling language, or protobuf. In at least some example embodiments, the first data model of the object and the second data model of the object are based on a Yet Another Next Generation (YANG) data modeling language. In at least some example embodiments, the linking between the first set of instance data of the object based on the first data model of the object and the second set of instance data of the object based on the second data model of the object is included within a container of a list element. In at least some example embodiments, the linking between the first set of instance data of the object based on the first data model of the object and the second set of instance data of the object based on the second data model of the object is included within a leaf within the container of the list element. In at least some example embodiments, the means for supporting management of the object of the communication device includes means for publishing the first data model of the object and the second data model of the object. In at least some example embodiments, the means for supporting management of the object of the communication device includes means for storing the first data model of the object and the second data model of the object. In at least some example embodiments, the means for supporting management of the object of the communication device includes means for storing the first set of instance data of the object based on the first data model of the object and the second set of instance data of the object based on the second data model of the object. In at least some example embodiments, the means for supporting management of the object of the communication device includes means for executing, at the communication device based on the first data model of the object or the second data model of the object, a management action. In at least some example embodiments, the means for supporting management of the object of the communication device includes means for executing, at the communication device based on the linking between the first set of instance data of the object based on the first data model of the object and the second set of instance data of the object based on the second data model of the object, a management action. In at least some example embodiments, the means for supporting management of the object of the communication device includes means for sending, by a management system toward the communication device based on the linking between the first set of instance data of the object based on the first data model of the object and the second set of instance data of the object based on the second data model of the object, a request for execution of a management action and means for receiving, by the management system from the communication device, an indication of a result of execution of the management action. In at least some example embodiments, the means for supporting management of the object of the communication device includes means for receiving, by the communication device from a management system, a request for execution of a management action, means for executing, by the communication device based on the linking between the first set of instance data of the object based on the first data model of the object and the second set of instance data of the object based on the second data model of the object, the management action, and means for sending, by the communication device toward the management system, an indication of a result of execution of the management system. In at least some example embodiments, the object includes at least one of a port, an interface, or an access control list. In at least some example embodiments, the communication device includes a router, a switch, or an endpoint device. In at least some example embodiments, the means for supporting is provided by the communication device or a management system configured to manage the communication device.

BRIEF DESCRIPTION OF THE DRAWINGS

The teachings herein can be readily understood by considering the following detailed description in conjunction with the accompanying drawings, in which:

FIG. 3 depicts an example embodiment of a standard data model of an object for configuring a set of standard routing policy commands;

FIG. 4 depicts an example embodiment of a standard object model augmentation that provides an augmentation of the standard data model of an object of FIG. 3 to enable the standard data model of an object of FIG. 3 to support a mapping between a standard object instance based on the standard data model of an object of FIG. 3 and a proprietary object instance based on the proprietary data model of an object of FIG. 2;

FIGS. 5A-5B depict example embodiments of instance data including instance data of proprietary routing policy commands configured based on the proprietary data model of the object of FIG. 2 and instance data of standard routing policy commands configured based on the standard object model augmentation of FIG. 4;

FIG. 6 depicts an example embodiment of a method for supporting management of a communication device based on a management model.

To facilitate understanding, identical reference numerals have been used herein, wherever possible, in order to designate identical elements that are common among the various figures.

DETAILED DESCRIPTION

Figure 1:
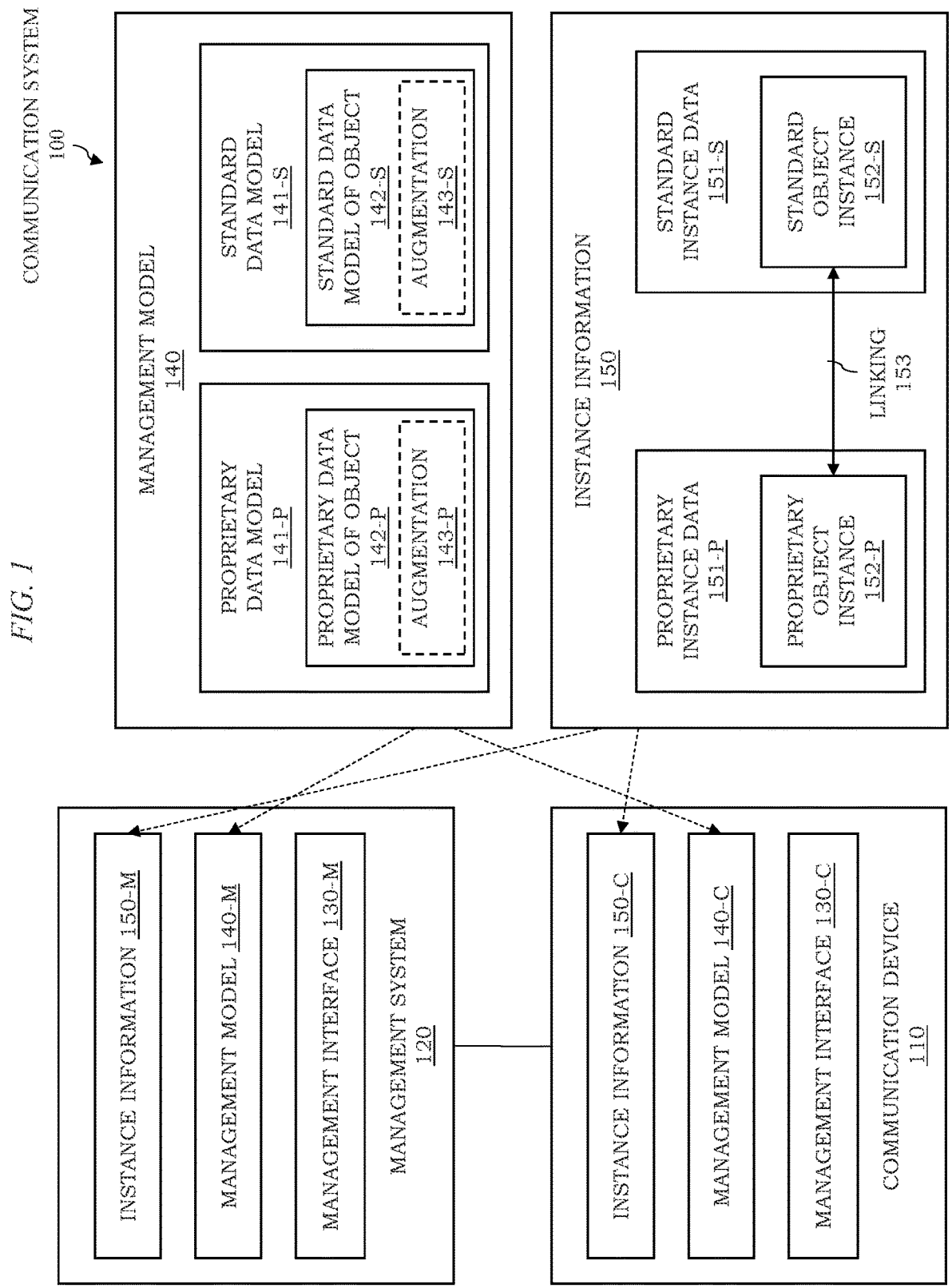
FIG. 1 depicts an example embodiment of a communication system configured to support management of a communication device based on a management model.

Various example embodiments for supporting management of a communication device are presented. Various example embodiments for supporting management of a communication device may be configured to support management of a communication device based on a management model. Various example embodiments for supporting management of a communication device based on a management model may be configured to support management of the communication device based on a management model that includes multiple data models used to model objects representing elements of the communication device (e.g., ports, interfaces, filters, or the like, as well as various combinations thereof). Various example embodiments for supporting management of a communication device based on a management model may be used to support management of the communication device based on a management model that includes multiple data models used to support association of instance data of an object that is generated based on the multiple data models (e.g., based on, for a given object instance that has associated instance data configured in two data models, a capability for linking a first set of instance data of the given object in a first one of the two data models to a second set of instance data of the given object in a second one of the two data models such that the communication device knows to apply both sets of instance data of the given object to the same single underlying operational object instance). Various example embodiments for supporting management of a communication device based on a management model may be used to support management of various types of communication devices which may be managed based on use of a management model including data models for modeling objects of the communication devices, including communication devices such as network devices (e.g., routers, switches, or the like), endpoint devices (e.g., end user devices, Internet-of-Things (IoT) devices, or the like), or the like. Various example embodiments for supporting management of a communication device based on a management model may be used to support management of the communication device based on a management model that includes multiple data models where the multiple data models may include a proprietary (vendor-specific) data model which may be developed by a vendor of the communication device and a standard (vendor-neutral) data model which may be provided by various standards bodies (e.g., Internet Engineering Task Force (IETF), OpenConfig, or the like) for the communication device type of the communication device. Various example embodiments for supporting management of a communication device based on a management model may be used to support management of the communication device based on a management model that includes multiple data models where the multiple data models, including the proprietary data model and the standard data model, may be based on various data modeling languages (e.g., Yet Another Next Generation (YANG), Unified Modeling Language (UML), protobuf, or the like). It will be appreciated that these and various other example embodiments and advantages or potential advantages of supporting management of a communication device based on a management model may be further understood by way of reference to the various figures, which are discussed further below.

FIG. 1 depicts an example embodiment of a communication system configured to support management of a communication device based on a management model.

The communication system 100 includes a communication device 110 and a management system 120 configured to provide management functions for the communication device 110. The communication device 110 may be any communication device which may be managed by a management system, such as a network device (e.g., a router, a switch, or the like), an endpoint device (e.g., a smartphone, a table, a computer, an IoT device, or the like), and so forth. The management system 120 may be any management system which may manage a communication device, such as an element management system (EMS), a network management system (NMS), a Software Defined Networking (SDN) Controller, a NETCONF client, and so forth. It is noted that, for purposes of clarity in describing various example embodiments for supporting management of a communication device based on a management model, various example embodiments are primarily presented herein within the context of management of a router by an element management system.

The communication system 100 supports management of the communication device 110 by the management system 120. The communication system 100 may support management of the communication device 110 by the management system 120 in various contexts. The communication device 110 may be provided by a communication device vendor and deployed by a communication device user. The management system may be provided by the communication device vendor, a management system vendor, developed in-house by the communication device user, or the like. For example, the communication device vendor may be a network equipment vendor where the communication device 110 is a network device, an endpoint equipment vendor where the communication device 110 is an endpoint device, or the like. The communication device user may be a network operator, an enterprise customer, an end user, or the like. It will be appreciated that management of the communication device 110 by the management system 120 may be provided within various other contexts.

The communication system 100 supports management of the communication device 110 by the management system 120 based on a management interface 130, a management model 140, and instance information 150. The management interface 130 may be configured to support interaction between the management system 120 and the communication device 110 for supporting management of the communication device 110 by the management system 120 based on the instance information 150. The management model 140 is used to support generation of instance information 150 which may be used to support management of the communication device 110 by the management system 120.

The management interface 130 includes a management interface 130-M on the management system and a management interface 130-C on the communication device 110. The management interface 130-C enables various management entities, including human entities and non-human entities, to connect to the communication device 110 in order to perform various management functions, such as configuring the communication device 110 (e.g., configuring ports, interfaces, or the like), collecting information from the communication device 110 (e.g., statistics, error codes, or the like), performing device operations (e.g., reboots or the like), or the like, as well as various combinations thereof. The management interface 130 may include one or more user-driven management interfaces, one or more machine-driven user interfaces, or the like, as well as various combinations thereof. The management interface 130 may include one or more of a command-line interface (CLI), a Simple Network Management Protocol (SNMP) interface, a Network Configuration Protocol (NETCONF) interface, a gRPC interface, or the like). It will be appreciated that various other management interfaces may be used to provide the management interface 130. It will be appreciated that the management interface 130 may be configured to support various other management functions and capabilities.

The management model 140 is configured to enable management of the communication device 110 by the management system 120 using various "model-driven" management techniques. The management model 140 is maintained on the management system 120 and the communication device 110. The management model 140 may be provided to the communication device 110 by the management system 120. The management model 140 includes a set of data models 141 including a proprietary (vendor-specific) data model 141-P and a standard (vendor-neutral) data model 141-S. The data models 141 may be based on one or more data modeling languages (e.g., YANG, UML, PROTOBUF, or the like), and may be the same for the proprietary data model 141-P and the standard data model 141-S or may be different for the proprietary data model 141-P and the standard data model 141-S. It is noted that the data models 141 also or alternatively may be referred to herein as modeling schemas. The management model 140 is used to support generation of the instance information 150 which may be used to support management of the communication device 110 by the management system 120. It will be appreciated that the management model 140 may be used to support various other management functions and capabilities.

The instance information 150 is configured to enable management of the communication device 110 by the management system 120. The instance information 150 is maintained on the management system 120 and the communication device 110. The instance information 150 may be exchanged between the management system 120 and the communication device 110 as instance information 150 is generated based on management of the communication device 110 by the management system 120, during use of instance information 150 to support management of the communication device 110 by the management system 120, or the like, as well as various combinations thereof. The instance information includes a set of instance data 151 including proprietary (vendor-specific) instance data 151-P and standard (vendor-neutral) instance data 151-S. The instance data 151, which is based on the data model 150 which may be described in various data modeling languages (e.g., YANG, UML, PROTOBUF, or the like), may have various formats/encodings (e.g., JavaScript Object Notation (JSON), Extensible Markup Language (XML), or the like) which may be independent of the data modeling language used to describe the data model 150. It will be appreciated that the format(s)/encoding(s) of the instance data 151 the same for the proprietary instance data 151-P and the standard instance data 151-S or may be different for the proprietary instance data 151-P and the standard instance data 151-S. It will be appreciated that the instance information 150 may be configured to support various other management functions and capabilities.

The management model 140 for supporting management of the communication device 110 by the management system 120, as indicated above, includes the proprietary data model 141-P. Many network element vendors have been developing proprietary (vendor-specific) data models for supporting management of their devices. These proprietary data models model the rich set of objects supported by their devices. It is noted that these proprietary data models of objects, since they are vendor-specific, may be more specific or detailed than the data models for corresponding objects in the vendor-neutral data models being produced by various standards organizations (which are discussed further below). These proprietary data models may be based on various data modeling languages (e.g., many network element vendors have been developing vendor-specific YANG data models and/or vendor-specific data models based on other data modeling languages). These proprietary data models, as depicted in FIG. 1, are supported by the devices of the equipment vendors (e.g., the communication device 110 in the example of FIG. 1) and by the management system(s) that are managing the devices of the equipment vendors (e.g., the management system 120 in the example of FIG. 1).

The management model 140 for supporting management of the communication device 110 by the management system 120, as indicated above, includes the standard data model 141-S. Many standards organizations (e.g., IETF, OpenConfig, and the like) have been developing standard (vendor-neutral) data models for supporting management of various types of devices (e.g., routers, switches, or the like). These proprietary data models support modeling of various types of objects supported by devices of various network element vendors (e.g., data models for various types of router objects typically supported by router vendors in their routers, data models for various types of switch objects typically supported by switch vendors in their switches, or the like). It is noted that these data models, since they are vendor-neutral, typically only include a subset of the functionality described by proprietary data models since the standard data models attempt to capture functionality that is common amongst vendors. These standard data models may be based on various data modeling languages (e.g., many standards organizations have been developing vendor-neutral YANG data models and/or vendor-neutral data models based on other data modeling languages). These standard data models, as depicted in FIG. 1, may be supported by the devices of the equipment vendors (e.g., the communication device 110 in the example of FIG. 1) and by the management system(s) that are managing the devices of the equipment vendors (e.g., the management system 120 in the example of FIG. 1).

The management model 140 for supporting management of the communication device 110 by the management system 120, as indicated above, includes both the proprietary data model 141-P and the standard data model 141-S. Many network element vendors are supporting standard (vendor-neutral) data models in addition to their own proprietary (vendor-specific) data models for management of communication devices. There are many elements available on communication devices that are fully manageable (e.g., describable, configurable, and the like) using standard data models, which may simplify communication device management by enabling users of communication devices to use standard data models across communication devices of different network element vendors (e.g., the users do not need to learn new proprietary data models for supporting management of the communication devices). However, there are also many elements on communication devices which may not be fully manageable using standard data models, such that users of the communication devices may need to perform some management functions using the standard data models and some management functions using the proprietary data models (e.g., an operator that is using standard YANG models on a router may perform some configuration using standard OpenConfig models and some configuration using native vendor operating system (OS) models).

The management model 140 for supporting management of the communication device 110 by the management system 120, as indicated above, is based on the data models 141. A data model 141 for the communication device 110 provides a schema that models, or describes, various elements of the communication device 110 (e.g., ports, interfaces, filters, or the like) which may be controlled for management of the communication device 110 (e.g., configuration of the communication device 110 to support services or functions, retrieval of state information from the communication device 110, or the like, as well as various combinations thereof). A data model 141 for the communication device 110 is configured to support management of the communication device 110 based on modeling of elements of the communication device 110 using data models of objects which represent the elements (or element types) of the communication device 110 (e.g., ports, interfaces, filters, or the like). In a data model 141 of the communication device 110, a data model of an object that represents an element (or element type) of the communication device 110 may be used as the model for describing one or more instances of that element on the communication device 110 (e.g., a port data model for a port of the communication device 110 provides a description that may be used for describing each of the ports (port instances) on the communication device 110, an interface data model for an interface of the communication device 110 provides a description that may be used for describing each of the interfaces (interface instances) on the communication device 110, a filter data model for a filter of the communication device 110 provides a description that may be used for describing each of the filters (filter instances) on the communication device 110, and so forth). For example, where YANG is used as the data modeling language, the "object" generally is referred to as a "list entry" in the YANG terminology. It is noted that examples of data models of objects for elements of the communication device 110, and associated instances of those elements of the communication device 110 that are described based on the associated data models of the associated objects in the data models 141 of the management model 140, are provided in FIGS. 2, 3, 4, and 5A-5B.

The management model 140 for supporting management of the communication device 110 by the management system 120, as indicated above, is based on the data models 141. In a data model 141 of the communication device 110, as indicated above, a data model for an object that represents an element (or element type) of the communication device 110 may be used as the model for describing one or more instances of that element on the communication device 110. A data model for an object that represents an element (or element type) of the communication device 110 provides a description of the modeling of that element (or element type) of the communication device 110 (e.g., the information used to describe the element, the organization of the information used to describe the element, the formatting rules for formatting the information used to describe the element, and so forth). A data model for an object that represents an element (or element type) provides a description of the modeling of that element (or element type) which may be used to describe instances of the element on the communication device 110. It will be appreciated that the data models for objects that represent elements of communication device 110 may be further understood with respect to the following examples.

For example, a data model for a port of the communication device 110, which is used to describe instances of ports of the communication device 110, may provide a description of the format for modeling of ports of the communication device 110 (e.g., attributes supported, arrangement of the attributes supported, formatting rules for formatting of values of the attributes supported, or the like, as well as various combinations thereof). For example, in the port data model for describing instances of ports of the communication device 110, the description of the format for modeling of the ports of the communication device 110 may indicate that modeling of each of the ports of the communication device 110 supports use of a port identifier for the port (and that the format for the port identifier is an unsigned integer), use of an IP address for the port (and that the format for the IP address has a particular format or data type), use of a receive counter for tracking a count of packets received via the port (and that the format for the receive counter has a particular format, such as an 8-bit value or other suitable data type), use of a transmit counter for tracking a count of packets transmitted via the port (and that the format for the transmit counter has a particular format, such as an 8-bit value or other suitable data type), and so forth. It will be appreciated, as indicated above, that the data model for ports of the communication device 110 may be used as a basis for describing each of the ports supported by the communication device 110 (i.e., the data model for a port object provides a description of the formatting for port instance data for ports of the communication device 110).

For example, a data model for an interface of the communication device 110, which is used to describe instances of interfaces of the communication device 110, may provide a description of the format for modeling of interfaces of the communication device 110 (e.g., attributes supported, arrangement of the attributes supported, formatting rules for formatting of values of the attributes supported, or the like, as well as various combinations thereof). For example, in the interface data model for describing instances of interfaces of the communication device 110, the description of the format for modeling of the interfaces of the communication device 110 may indicate that modeling of each of the interfaces of the communication device 110 supports use of an interface identifier for the interface (and that the format for the interface identifier is an unsigned integer), use of an interface type of the interface (and the format for specifying the interface type), use of an interface speed of the interface (and the format for specifying the interface speed), use of an IP address for the interface (and that the format for the IP address has a particular format or data type), and so forth. It will be appreciated, as indicated above, that the data model for interfaces of the communication device 110 may be used as a basis for describing each of the interfaces supported by the communication device 110 (i.e., the data model for an interface object provides a description of the formatting for interface instance data for interfaces of the communication device 110).

For example, a data model for a filter of the communication device 110, which is used to describe instances of filters (e.g., ACLs) of the communication device 110, may provide a description of the format for modeling of filters of the communication device 110 (e.g., attributes supported, arrangement of the attributes supported, formatting rules for formatting of values of the attributes supported, or the like, as well as various combinations thereof). For example, in the filter data model for describing instances of filters of the communication device 110, the description of the format for modeling of the filters of the communication device 110 may indicate that modeling of each of the filters of the communication device 110 supports use of a default-action indicator (and that the format for the default-action indicator is that it must be set to "permit" or "deny" where it will be understood that "permit" and "deny" may be default filtering options which may be modified with exceptions), use of a set of containers where each container supports use of a source IP address (and that the format for the IP address has a particular format or data type) and an action indicator (and that the format for the action indicator is that it must be set to "permit" or "deny"), and so forth. It will be appreciated, as indicated above, that the data model for filters of the communication device 110 may be used as a basis for describing each of the filters supported by the communication device 110 (i.e., the data model for a filter object provides a description of the formatting for filter instance data for filters of the communication device 110).

It will be appreciated that the forgoing examples are merely a few of the element types which may be supported by, and, thus, modeled for, a communication device.

The management model 140 for supporting management of the communication device 110 by the management system 120, as indicated above, is based on use of multiple data models 141. It is noted that the availability of multiple data models 141 to support management of the communication device 110 means that at least some of the elements of the communication device 110 may be modeled in multiple data models 141 and, in at least some cases, may be modeled differently in different data models 141 of the management model 140. In other words, while use of multiple data models 141 to support management of the communication device 110 may provide certain flexibility in management of the communication device 110 (e.g., where different data models 141 enable support for different functions or features which may be applied, for a common element type, in the management of the communication device 110), use of multiple data models 141 to support management of the communication device 110 also may introduce various complexities for various associated parties (including both the vendor of the communication device 110 and the users of the communication device 110).

The management model 140 for supporting management of the communication device 110 by the management system 120 based on use of multiple data models 141, as indicated above, may result in certain complexities. In some cases, when an object (e.g., a list entry in YANG terminology) is identified in the same way (e.g., using a "key" in YANG terminology) in the standard data model 141-S and the proprietary data model 141-P, then it may be easier to understand the association between the standard data model of the object and the proprietary data model of object (i.e. it may be seen that the two data models for the object represent the same element of the communication device 110). For example, an access control list (ACL) may be identified by a string name (e.g., ad "ingress-trusted") in both YANG data models (i.e., in the standard YANG model and the proprietary YANG model). In some cases, when an object (e.g., a list entry in YANG terminology) is identified (using a "key" in YANG terminology) differently in the standard data model 141-S and the proprietary data model 141-P, then it may be more difficult to understand the association between the standard data model of the object and the proprietary data model of the object (i.e., it may not be obvious that the two data models for the object represent the same element of the communication device 110). For example, an access control list may be identified by a string name (e.g., ad "ingress-trusted") in one of the YANG data models and a numerical identifier (e.g., acl "5") in the other of the YANG data models. In this case, it is not clear that "ingress-trusted" and "5" are the same underlying object representing the same type of element in the communication device 110.

The management model 140 for supporting management of the communication device 110 by the management system 120 based on use of multiple data models 141 may be used to support associations between object instances of an object of the communication device 110 that are based on the multiple data models 141. The management model 140 may be configured, for a particular element of the communication device 110 that is modeled as an object, to support a standard data model of the object 142-S (where it will be appreciated that 142-S refers to the model) that is supported by the standard data model 141-S and a proprietary data model of the object 142-P (where it will be appreciated that 142-P refers to the model) that is supported by the proprietary data model 141-P (where the standard data model of the object 142-S and the proprietary data model of the object 142-P may be referred to collectively as data models of the object 142). The standard data model of the object 142-S may be used to generate standard object instances such as standard object instance 152-S of the standard instance data 151-S and the proprietary data model of the object 142-P may be used to generate proprietary object instances such as proprietary object instance 152-P of the proprietary instance data 151-P (where the standard object instance 152-S and the proprietary object instance 152-P may be referred to collectively as object instances 152). The object instances 152 of the object may then be used to support management of the communication device 110 by the management system 120.

The management model 140 for supporting management of the communication device 110 by the management system 120 based on use of multiple data models 141 may be used to support associations between object instances of an object of the communication device 110, such as object instances 152, based on augmentation of at least one of the data models of the object 142. The management model 140 for supporting management of the communication device 110 by the management system 120 based on use of multiple data models 141 may be used to support associations between object instances of an object of the communication device 110, such as object instances 152, based on at least one of an augmentation 143-S of the standard data model of the object 142-S or an augmentation 143-P of the proprietary model of the object 142-P (where the augmentation 143-S and the augmentation 143-P may be referred to collectively as augmentations 143). The augmentation 143-S of the standard data model of the object 142-S and/or the augmentation 143-P of the proprietary model of the object 142-P enables support for a linking 153 between the standard object instance 152-S and the proprietary object instance 152-P. The use of one or more augmentations of one or more data models of an object (e.g., either or both of the augmentations 143 of the data models of the object 142) to support a linking between object instances created based on the data models of the object (e.g., the linking 153 between the standard object instance 152-S generated based on the standard data model of the object 142-S and the proprietary object instance 152-P generated based on the proprietary data model of the object 142-P) may be provided based on various conditions, may be provided using various linking mechanisms, or the like, as well as various combinations thereof.

In the management model 140, as indicated above, the linking 153 between the standard object instance 152-S generated based on the standard data model of the object 142-S and the proprietary object instance 152-P generated based on the proprietary data model of the object 142-P may be provided based on various conditions. For example, the linking 153 between the standard object instance 152-S generated based on the standard data model of the object 142-S and the proprietary object instance 152-P generated based on the proprietary data model of the object 142-P may be provided based on a determination that a common attribute of the standard data model of the object 142-S and the proprietary data model of the object 142-P (e.g., an object identifier, an object descriptor, or the like) is different across the standard data model of the object 142-S and the proprietary data model of the object 142-P. For example, the linking 153 between the standard object instance 152-S generated based on the standard data model of the object 142-S and the proprietary object instance 152-P generated based on the proprietary data model of the object 142-P may be provided based on a determination that the standard data model of the object 142-S includes an object identifier in a first format (e.g., a numeric format, a string format, a list format, a hierarchical format, or the like) and the proprietary data model of the object 142-P includes an object identifier in a second format (e.g., a numeric format, a string format, a list format, a hierarchical format, or the like). It will be appreciated that the linking 143 between the standard data model of the object 142-S and the proprietary data model of the object 142-P may be provided based on various other conditions (e.g., differences in formats of various other data model attributes besides the object identifiers of the data models of the object 142, differences in various aspects of data model attributes besides the formats of the data model attributes of the data models of the objects 142, or the like, as well as various combinations thereof). It will be appreciated that the linking 153 between the standard object instance 152-S generated based on the standard data model of the object 142-S and the proprietary object instance 152-P generated based on the proprietary data model of the object 142-P may be provided based on various other types of conditions. It will be appreciated that the condition(s) which form the basis for the linking 153 between the standard object instance 152-S generated based on the standard data model of the object 142-S and the proprietary object instance 152-P generated based on the proprietary data model of the object 142-P may vary across the different types of data modeling language(s) used for the data models 141 of the management model 140.

In the management model 140, as indicated above, the linking 153 between the standard object instance 152-S generated based on the standard data model of the object 142-S and the proprietary object instance 152-P generated based on the proprietary data model of the object 142-P may be provided using various linking mechanisms. For example, the linking 153 between the standard object instance 152-S generated based on the standard data model of the object 142-S and the proprietary object instance 152-P generated based on the proprietary data model of the object 142-P may be provided by using a reference element that is added to either or both of the standard object instance 152-S or the proprietary object instance 152-P based on the one or more augmentations 153 of either or both of the standard data model of the object 142-S and the proprietary data model of the object 142. For example, where a data model 141 is based on YANG and a data model of an object 142 of the data model 141 is augmented to enable a corresponding object instance 152 to include a reference to a different object instance 152 generated based on a different data model of an object 142 of a different data model 141, the reference may be provided in the form of an external-reference container that is added into the list element where the external-reference container includes a leaf or leaves which may be configured to describe the reference to the different object instance 152 so as to bind to the different object instance 152 to the to object instance 152. It will be appreciated that the format of the linking 153 between the standard object instance 152-S generated based on the standard data model of the object 142-S and the proprietary object instance 152-P generated based on the proprietary data model of the object 142-P may depend on the underlying data modeling language(s) used for the standard data model 141-S and the proprietary data model 141-P and, thus, may be provided in various other ways.

Figure 2:
FIG. 2 depicts an example embodiment of a proprietary data model of an object for configuring a set of proprietary routing policy commands.

It will be appreciated that the management model 140 may be further understood by way of reference to the example data models of FIG. 2, FIG. 3, and FIG. 4 and the example object instance of FIGS. 5A and 5B.

FIG. 2 depicts an example embodiment of a proprietary data model of an object for configuring a set of proprietary routing policy commands. The proprietary data model of an object 200 is a data model of an object developed by a vendor for defining a set of proprietary routing policy commands. The proprietary data model of an object 200 is defined based on YANG.

FIG. 3 depicts an example embodiment of a standard data model of an object for configuring a set of standard routing policy commands. The standard data model of an object 300 is a data model of an object developed by a standards organization for defining a set of standard routing policy commands that are based on the OpenConfig standard. The standard data model of an object 300 is defined based on YANG.

It will be appreciated that, although omitted from FIG. 2 and FIG. 3 for purposes of clarity, the routing policy commands also may define various conditions (e.g., using an OSPF area as a match criteria for the rule), various actions to be taken (e.g., assigning a BGP MED to routes matching the rule), or the like, as well as various combinations thereof.

FIG. 4 depicts an example embodiment of a standard object model augmentation that provides an augmentation of the standard data model of an object of FIG. 3 to enable the standard data model of an object of FIG. 3 to support a mapping between a standard object instance based on the standard data model of an object of FIG. 3 and a proprietary object instance based on the proprietary data model of an object of FIG. 2. The augmentation of the standard data model of an object 400 is used to enable the standard data model of an object 300 of FIG. 3 to support a mapping between a standard object instance based on the standard data model of an object 300 of FIG. 3 and a proprietary object instance based on the proprietary data model of an object 200 of FIG. 2. The augmentation of the standard data model of an object 400 provides the mapping between the standard object instance based on the standard data model of an object 300 of FIG. 3 and the proprietary object instance based on the proprietary data model of an object 200 of FIG. 2 in the form of an external-reference container that includes a leaf that supports a policy-entry-id which may be used to provide the mapping. The policy-entry-id may be used to specify the object identifier (i.e., the list key in YANG terminology) of the proprietary object instance that maps to the standard object instance for the given element of the communication device. It will be appreciated that the use of the augmentation of the standard data model of an object 400 to support a mapping between a standard object instance based on the standard data model of an object 300 of FIG. 3 and a proprietary object instance based on the proprietary data model of an object 200 of FIG. 2 may be further understood by way of reference to the example object instance data of FIGS. 5A and 5B.

FIGS. 5A-5B depict example embodiments of instance data including instance data of proprietary routing policy commands configured based on the proprietary data model of the object of FIG. 2 and instance data of standard routing policy commands configured based on the standard object model augmentation of FIG. 4.

FIG. 5A includes proprietary object instance data 500-P that includes a first proprietary object instance including a first set of proprietary routing policy configurations which are part of an entry having an object identifier of "7" (indicated by "entry 7") and a proprietary object instance including a second set of proprietary routing policy configurations which are part of an entry having an object identifier of "232" (indicated by "entry 232"). FIG. 5B includes augmented standard object instance data 500-S that includes a first augmented standard object instance including a first set of standard routing policy configurations which are part of a statement having an object identifier of "my-rules" (indicated by 'statement "my-rules"') and a second augmented standard object instance including a second set of standard routing policy configurations which are part of a statement having an object identifier of "other-rules" (indicated by 'statement "other-rules"').

The first augmented standard object instance defining the first set of standard routing policy configurations has been augmented with an external-reference container that includes a leaf identifying the first proprietary object instance including the first set of proprietary routing policy configurations of FIG. 5A (indicated by "policy-entry-id 7" where the "7" maps to the first proprietary object instance that includes the first set of proprietary routing policy configurations as illustrated in FIG. 5A) so as to form an association between the first augmented standard object instance of FIG. 5B and the first proprietary object instance of FIG. 5A (and, thus, between the first set of standard routing policy configurations and the first set of proprietary routing policy configurations). In other words, the augmentation of the standard model of the object to support the external-reference enables the management system, the communication device, and various other entities (e.g., machines, users, or the like) to understand the intention that "my-rules" and "7" are the same set of routing policy configuration for the communication device, related sets of routing policy configurations for the communication device, associated in some other way for the communication device, or the like, as well as various combinations thereof.

The second augmented standard object instance defining the second set of standard routing policy configurations has been augmented with an external-reference container that includes a leaf identifying the second proprietary object instance including the second set of proprietary routing policy configurations of FIG. 5A (indicated by "policy-entry-id 232" where the "232" maps to the second proprietary object that includes the second set of proprietary routing policy configurations as illustrated in FIG. 5A) so as to form an association between the second augmented standard object instance of FIG. 5B and the second proprietary object instance of FIG. 5A (and, thus, between the second set of standard routing policy configurations and the second set of proprietary routing policy configurations). In other words, the augmentation of the standard model of the object to support the external-reference enables the management system, the communication device, and various other entities (e.g., machines, users, or the like) to understand the intention that "other-rules" and "232" are the same set of routing policy configuration for the communication device, related sets of routing policy configurations for the communication device, associated in some other way for the communication device, or the like, as well as various combinations thereof.

In terms of creating the association, it will be appreciated that the management system may configure a routing policy "statement" in the OpenConfig model (e.g., statement "my-rules") and then, based on a determination that there is some additional configuration for "my-rules" (e.g. turning on logging, enabling counters for that rule, or the like) that is not possible via the OpenConfig model, may create a rule (e.g., entry "7") in the proprietary model and then link the newly created rule "7" to the "my-rules" statement to tell the communication device that those are the same entries in the underlying operational layer; otherwise, the router would treat "my-rules" and "7" as separate routing policy rules.

It will be appreciated that, although primarily presented with respect to example embodiments in which the standard data model of an object for an element of a communication device is augmented to enable a standard object instance based on the standard data model of the object to include a mapping to a proprietary object instance based on a proprietary data model of an object for the element of the communication device, in at least some example embodiments the proprietary data model of an object for an element of a communication device may be augmented to enable a proprietary object instance based on the proprietary data model of the object to include a mapping to a standard object instance based on a standard data model of an object for the element of the communication device. It will be appreciated that augmentation of the standard data model of an object and/or the proprietary data model of an object may vary based on various conditions (e.g., for different element types of the communication device being modeled, for different data modeling languages being used, or the like, as well as various combinations thereof).

It will be appreciated that, although primarily presented with respect to embodiments in which either the standard data model of an object for an element of a communication device is augmented to support mappings between standard object instance data and proprietary object instance data for the element of the communication device or the proprietary data model of an object for an element of a communication device is augmented to support mappings between proprietary object instance data and proprietary object instance data for the element of the communication device, in at least some example embodiments both the standard data model of an object for an element of a communication device is augmented to support mappings between standard object instance data and proprietary object instance data for the element of the communication device and the proprietary data model of an object for an element of a communication device is augmented to support mappings between proprietary object instance data and proprietary object instance data for the element of the communication device. It will be appreciated that augmentation of standard data models of objects and/or proprietary data models of objects, including which data models of objects are augmented, may vary based on various conditions (e.g., for different element types of the communication device being modeled, for different data modeling languages being used, or the like, as well as various combinations thereof).

It will be appreciated that, although primarily presented with respect to example embodiments in which the different sets of object instance data of an element of a communication device, based on different data models, are linked based on a particular type of difference between the different sets of object instance data of the element of the communication device (namely, in which the object identifiers, or "keys" in YANG terminology, are different formats (e.g., numeric versus string identifiers)), different sets of object instance data of an element of a communication device may be associated where the difference between the different sets of object instance data of the element of the communication device is based on other types of differences.

It will be appreciated that, although primarily presented with respect to example embodiments in which the different sets of object instance data of an element of a communication device, which are based on different data models, are linked based on inclusion of a particular type of parameter (namely, use of an "external-reference" parameter) within either or both of the sets of object instance data of the element of the communication device, the different sets of object instance data of an element of a communication device may be linked in various other ways (e.g., using parameters which may have other names, using other types of parameters, or the like, as well as various combinations thereof).

It will be appreciated that, although primarily presented with respect to example embodiments in which the element of the communication device that is modeled using data models of objects is a particular type of element of the communication device (e.g., an element having routing policy configurations), various example embodiments for supporting association of different sets of object instance data based on different data models, based on augmentation of the data models to support the association of the different sets of object instance data based on the different data models, may be applied for supporting management of various other types of elements of the communication device.

It will be appreciated that, although primarily presented herein with respect to use of a specific data modeling language to provide the data models of the management model used to manage the communication device (namely, the YANG data modeling language), various example embodiments presented herein may use various other types of data modeling languages to provide the data models of the management model used to manage the communication device.

FIG. 6 depicts an example embodiment of a method for supporting management of a communication device based on a management model. It will be appreciated that, although primarily presented as being performed serially, at least a portion of the functions of method 600 may be performed contemporaneously or in a different order than as presented with respect to FIG. 6. At block 601, the method 600 begins. At block 610, support management of an object of a communication device based on a first data model of the object and a second data model of the object, wherein the first data model of the object is a vendor-neutral data model and the second data model of the object is a vendor-specific data model, wherein at least one of the first data model of the object or the second data model of the object is used to support use of a reference configured to indicate a linking between a first set of instance data of the object based on the first data model of the object and a second set of instance data of the object based on the second data model of the object. At block 699, the method 600 ends.

Various example embodiments for supporting management of a communication device based on a management model may provide various advantages or potential advantages. For example, various example embodiments for supporting management of a communication device based on a management model may be configured to support management of the communication device based on a management model that includes multiple data models used to support association of instance data of an object that is generated based on the multiple data models (e.g., based on, for a given object that has associated instance data configured in two data models, a capability for linking the instance data of the given object in a first one of the two data models to the instance data of the given object in a second one of the two data models such that the communication device knows to apply both sets of instance data to the same single underlying operational object instance. Various example embodiments for supporting management of a communication device based on a management model may provide various other advantages or potential advantages.

Figure 7:
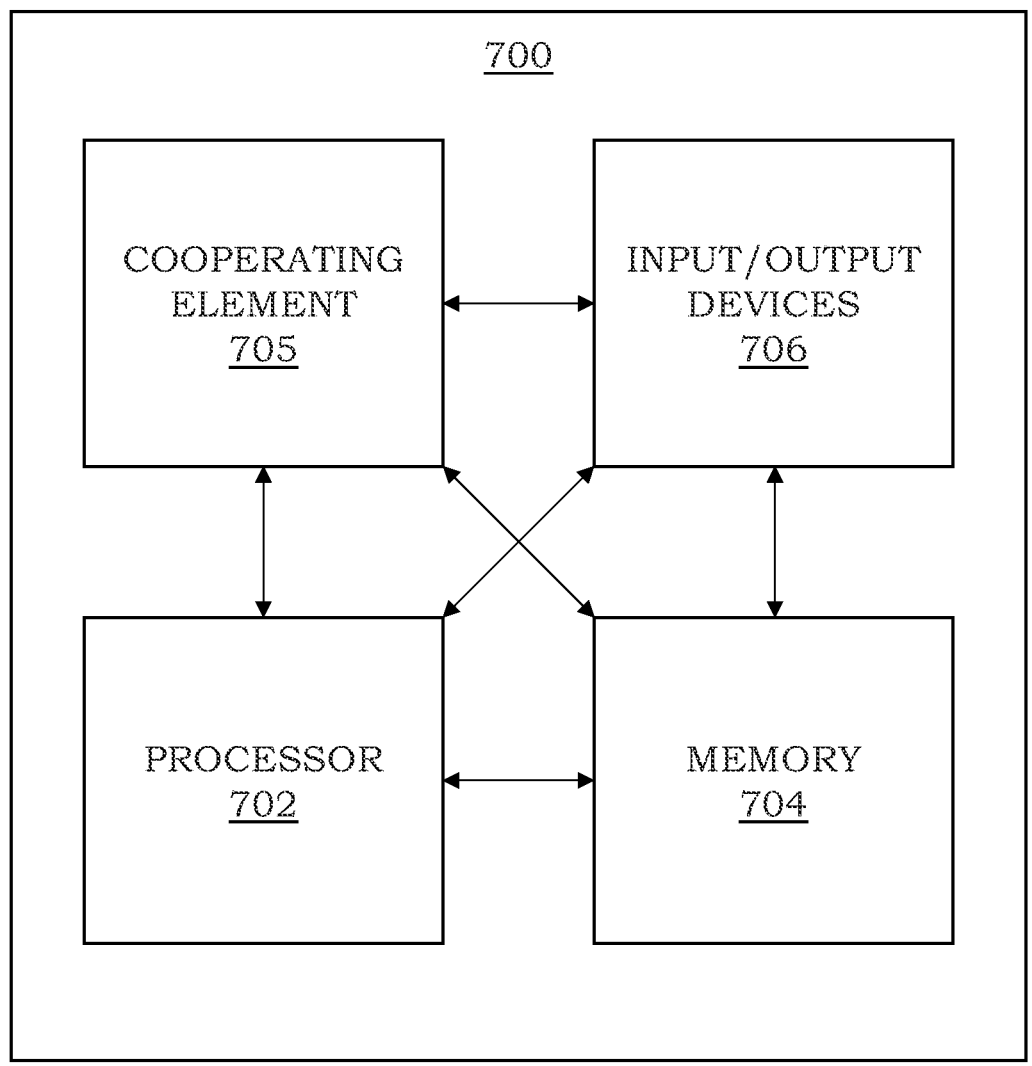
FIG. 7 depicts an example embodiment of a computer suitable for use in performing various functions presented herein.

FIG. 7 depicts an example embodiment of a computer suitable for use in performing various functions presented herein.

The computer 700 includes a processor 702 (e.g., a central processing unit (CPU), a processor, a processor having a set of processor cores, a processor core of a processor, or the like) and a memory 704 (e.g., a random access memory, a read only memory, or the like). The processor 702 and the memory 704 may be communicatively connected. In at least some example embodiments, the computer 700 may include at least one processor and at least one memory including a set of instructions which, when executed by the at least one processor, cause the computer 700 to perform various functions presented herein.

The computer 700 also may include a cooperating element 705. The cooperating element 705 may be a hardware device. The cooperating element 705 may be a process that can be loaded into the memory 704 and executed by the processor 702 to implement various functions presented herein (in which case, for example, the cooperating element 705 (including associated data structures) can be stored on a non-transitory computer-readable storage medium, such as a storage device or other suitable type of storage element (e.g., a magnetic drive, an optical drive, or the like)).

The computer 700 also may include one or more input/output devices 706. The input/output devices 706 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices (e.g., a tape drive, a floppy drive, a hard disk drive, a compact disk drive, or the like), or the like, as well as various combinations thereof.

It will be appreciated that computer 700 may represent a general architecture and functionality suitable for implementing functional elements described herein, portions of functional elements described herein, or the like, as well as various combinations thereof. For example, computer 700 may provide a general architecture and functionality that is suitable for implementing one or more elements presented herein, such as network devices (e.g., routers or the like), network controllers, or the like, as well as various combinations thereof.

It will be appreciated that at least some of the functions presented herein may be implemented in software (e.g., via implementation of software on one or more processors, for executing on a general purpose computer (e.g., via execution by one or more processors) so as to provide a special purpose computer, and the like) and/or may be implemented in hardware (e.g., using a general purpose computer, one or more application specific integrated circuits, and/or any other hardware equivalents).

It will be appreciated that at least some of the functions presented herein may be implemented within hardware, for example, as circuitry that cooperates with the processor to perform various functions. Portions of the functions/elements described herein may be implemented as a computer program product wherein computer instructions, when processed by a computer, adapt the operation of the computer such that the methods and/or techniques described herein are invoked or otherwise provided. Instructions for invoking the various methods may be stored in fixed or removable media (e.g., non-transitory computer-readable media), transmitted via a data stream in a broadcast or other signal bearing medium, and/or stored within a memory within a computing device operating according to the instructions.

It will be appreciated that the term "or" as used herein refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
at least one processor; and
at least one memory storing instructions which, when executed by the at least one processor, cause the apparatus to:
maintain, for an object of a communication device, a first data model of the object and a second data model of the object, wherein the first data model of the object is a vendor-neutral data model and the second data model of the object is a vendor-specific data model, wherein at least one of the first data model of the object is augmented to support use of a first reference identifying the second data model of the object or the second data model of the object is augmented to support use of a second reference identifying the first data model of the object;

identify, for the object based on at least one of identification of the first reference in a first set of instance data of the object that is based on the first data model of the object or identification of the second reference in a second set of instance data of the object based on the second data model of the object, a linking between the first set of instance data of the object based on the first data model of the object and the second set of instance data of the object based on the second data model of the object, wherein the linking is indicative that the first set of instance data of the object based on the first data model of the object and the second set of instance data of the object based on the second data model of the object are each configured for managing the object of the communication device; and initiate, based on the linking being indicative that the first set of instance data of the object based on the first data model of the object and the second set of instance data of the object based on the second data model of the object are each configured for managing the object of the communication device, a management action for the communication device that is based on at least one of application of the first set of instance data of the object based on the first data model of the object or application of the second set of instance data of the object based on the second data model of the object.

2. The apparatus of claim 1, wherein the first data model of the object defines a first object identifier in a first format and the second data model of the object defines a second object identifier in a second format different than the first format.

3. The apparatus of claim 2, wherein the first format includes a string format and the second format includes a numeric format or the first format includes a numeric format and the second format includes a string format.

4. The apparatus of claim 2, wherein the first format includes a list format and the second format includes a hierarchical format or the first format includes a hierarchical format and the second format includes a list format.

5. The apparatus of claim 1, wherein the first data model of the object is part of an Internet Engineering Task Force data model or an OpenConfig data model.

6. The apparatus of claim 1, wherein the second data model of the object is part of a vendor proprietary data model.

7. The apparatus of claim 1, wherein the first data model of the object is based on at least one of a Yet Another Next Generation (YANG) data modeling language, a Unified Modeling Language (UML) data modeling language, or protobuf.

8. The apparatus of claim 1, wherein the second data model of the object is based on at least one of a Yet Another Next Generation (YANG) data modeling language, a Unified Modeling Language (UML) data modeling language, or protobuf.

9. The apparatus of claim 1, wherein the first data model of the object and the second data model of the object are based on a Yet Another Next Generation (YANG) data modeling language.

10. The apparatus of claim 9, wherein the linking between the first set of instance data of the object based on the first data model of the object and the second set of instance data of the object based on the second data model of the object is included within a container of a list element.

11. The apparatus of claim 10, wherein the linking between the first set of instance data of the object based on the first data model of the object and the second set of instance data of the object based on the second data model of the object is included within a leaf within the container of the list element.

12. The apparatus of claim 1, wherein the instructions, when executed by the at least one processor, cause the apparatus to:

publish the first data model of the object and the second data model of the object.

13. The apparatus of claim 1, wherein the instructions, when executed by the at least one processor, cause the apparatus to:

store the first data model of the object and the second data model of the object.

14. The apparatus of claim 1, wherein the instructions, when executed by the at least one processor, cause the apparatus to:

store the first set of instance data of the object based on the first data model of the object and the second set of instance data of the object based on the second data model of the object.

15. The apparatus of claim 1, wherein, to initiate the management action for the communication device, the instructions, when executed by the at least one processor, cause the apparatus to:

execute, at the communication device, the management action for the communication device.

16. The apparatus of claim 1, wherein, to initiate the management action for the communication device, they instructions, when executed by the at least one processor, cause the apparatus to:

send, by a management system toward the communication device, a request for execution of the management action for the communication device; and receive, by the management system from the communication device, an indication of a result of execution of the management action for the communication device.

17. The apparatus of claim 1, wherein, to initiate the management action for the communication device, the instructions, when executed by the at least one processor, cause the apparatus to:

receive, by the communication device from a management system, a request for execution of the management action for the communication device;

execute, by the communication device, the management action for the communication device; and send, by the communication device toward the management system, an indication of a result of execution of the management system for the communication device.

18. The apparatus of claim 1, wherein the object includes at least one of a port, an interface, or an access control list.

19. The apparatus of claim 1, wherein the communication device includes a router, a switch, or an endpoint device.

20. The apparatus of claim 1, wherein the apparatus includes the communication device or a management system configured to manage the communication device.

21. A non-transitory computer-readable medium comprising computer program instructions which, when executed by an apparatus, cause the apparatus to:

maintain, for an object of a communication device, a first data model of the object and a second data model of the object, wherein the first data model of the object is a vendor-neutral data model and the second data model of the object is a vendor-specific data model, wherein at least one of the first data model of the object is augmented to support use of a first reference identifying the second data model of the object or the second data model of the object is augmented to support use of a second reference identifying the first data model of the object;

identify, for the object based on at least one of identification of the first reference in a first set of instance data of the object that is based on the first data model of the object or identification of the second reference in a second set of instance data of the object based on the second data model of the object, a linking between the first set of instance data of the object based on the first data model of the object and the second set of instance data of the object based on the second data model of the object wherein the linking is indicative that the first set of instance data of the object based on the first data model of the object and the second set of instance data of the object based on the second data model of the object are each configured for managing the object of the communication device; and initiate, based on the linking being indicative that the first set of instance data of the object based on the first data model of the object and the second set of instance data of the object based on the second data model of the object are each configured for managing the object of the communication device, a management action for the communication device that is based on at least one of application of the first set of instance data of the object based on the first data model of the object or application of the second set of instance data of the object based on the second data model of the object.

22. A method, comprising:

maintaining, for an object of a communication device, a first data model of the object and a second data model of the object, wherein the first data model of the object is a vendor-neutral data model and the second data model of the object is a vendor-specific data model, wherein at least one of the first data model of the object is augmented to support use of a first reference identifying the second data model of the object or the second data model of the object is augmented to support use of a second reference identifying the first data model of the object;

identifying, for the object based on at least one of identification of the first reference in a first set of instance data of the object that is based on the first data model of the object or identification of the second reference in a second set of instance data of the object based on the second data model of the object, a linking between the first set of instance data of the object based on the first data model of the object and the second set of instance data of the object based on the second data model of the object wherein the linking is indicative that the first set of instance data of the object based on the first data model of the object and the second set of instance data of the object based on the second data model of the object are each configured for managing the object of the communication device; and initiating, based on the linking being indicative that the first set of instance data of the object based on the first data model of the object and the second set of instance data of the object based on the second data model of the object are each configured for managing the object of the communication device, a management action for the communication device that is based on at least one of application of the first set of instance data of the object based on the first data model of the object or application of the second set of instance data of the object based on the second data model of the object.

* * * * *